United States Patent

Yamaji

[19]

[11] Patent Number: 6,141,385
[45] Date of Patent: Oct. 31, 2000

[54] MPEG CODED PICTURE DECODING APPARATUS

[75] Inventor: Hirotaka Yamaji, Tokyo, Japan

[73] Assignee: NEC Corporation, Tokyo, Japan

[21] Appl. No.: 08/827,474

[22] Filed: Mar. 27, 1997

[30] Foreign Application Priority Data

Mar. 28, 1996 [JP] Japan .................................. 8-074698

[51] Int. Cl.[7] .................................................. H04N 7/32
[52] U.S. Cl. .............................. 375/240.27; 375/240.12
[58] Field of Search ................................. 348/384, 390, 348/400–402, 405–407, 409–413, 415, 416, 420, 426, 607, 699, 714–716, 718, 845, 845.1; 382/232, 236, 238; 714/18, 748; 375/240.01, 240.12, 240.13, 240.14, 240.24, 240.25, 240.26, 240.27; H04N 7/32

[56] References Cited

U.S. PATENT DOCUMENTS

| | | | |
|---|---|---|---|
| 5,172,246 | 12/1992 | Yoshida | 358/406 |
| 5,400,076 | 3/1995 | Iwamura | 348/413 |
| 5,491,516 | 2/1996 | Casavant et al. | 348/415 |
| 5,502,494 | 3/1996 | Auld | 348/426 |
| 5,528,284 | 6/1996 | Iwami et al. | 348/405 |
| 5,550,847 | 8/1996 | Zhu | 348/409 |
| 5,561,532 | 10/1996 | Ohnishi et al. | 348/607 |
| 5,680,322 | 10/1997 | Shinoda | 714/18 |
| 5,706,053 | 1/1998 | Urano | 348/402 |
| 5,715,008 | 2/1998 | Sekiguchi et al. | 348/699 |
| 5,719,646 | 2/1998 | Kikuchi et al. | 348/845.1 |
| 5,737,022 | 4/1998 | Yamaguchi et al. | 348/845.1 |
| 5,790,264 | 8/1998 | Sasaki et al. | 348/420 |
| 5,847,763 | 12/1998 | Matsumura et al. | 348/416 |

FOREIGN PATENT DOCUMENTS

| | | |
|---|---|---|
| 1-280939 | 11/1989 | Japan . |
| 2-272975 | 11/1990 | Japan . |
| 4-170184 | 6/1992 | Japan . |
| 5-153574 | 6/1993 | Japan . |
| 6-237451 | 8/1994 | Japan . |
| 7-322248 | 12/1995 | Japan . |
| 8-63884 | 3/1996 | Japan . |
| 8-294123 | 11/1996 | Japan . |

OTHER PUBLICATIONS

Anonymous: "Demand Data Cache Prefetching to Improve the Performance of Multimedia Applications", *IBM Technical Disclosure Bulletin*, vol. 36, No. 12, Dec. 1993, pp. 517–522.

*Patent Abstracts of Japan*, vol. 097, No. 001, Jan. 31, 1997 & JP 08 251538—Sep. 27, 1996.

*Primary Examiner*—Richard Lee
*Attorney, Agent, or Firm*—Ostrolenk, Faber, Gerb & Soffen, LLP

[57] ABSTRACT

An MPEG coded picture decoding apparatus is provided which can display video data quite the same as original data even if a miss of MPEG coded video data occurs in a transmission line or the like. The MPEG coded picture decoding apparatus includes a stream buffer memory for storing an MPEG stream, a pack header processing section for separating a pack header of the MPEG stream and extracting SCR information, a PES packet processing section for separating a header of a PES stream, extracting PTS information and separating packets, a GOP detection section for detecting a GOP of a video stream, a video buffer memory for storing the video stream, a video MPEG decoding section for MPEG decoding the video stream, a decoded data storage section for storing and managing one picture frame, a video display processing section for storing several picture frames and reading out at a display timing, and an error information processing section for supervising a picture frame memory at each display timing and developing a video re-sending request when the picture frame memory is in an irregular condition.

3 Claims, 4 Drawing Sheets

MPEG CODED PICTURE DECODING APPARATUS

BACKGROUND OF THE INVENTION

1. Field of the Invention

This invention relates to an MPEG-2 (Moving Picture Experts Group) (hereinafter MPEG) coded picture decoding apparatus, and more particularly to an MPEG coded picture decoding apparatus which includes an error picture re-sending section which is used when MPEG coded picture data suffer from a data error such as a miss of data in a transmission line or the like.

2. Description of the Related Art

In a conventional MPEG coded picture decoding apparatus, when an uncorrectable code error, for example, a transmission error such as a long burst error, occurs with MPEG coded picture data in a transmission line, a decoded picture suffers from significant degradation in picture quality or a missing portion is produced in a picture. Therefore, the degraded picture or the picture having the missing part is replaced with another picture in the past on the decoding side to correct the picture smoothly with respect to a surrounding picture.

For example, in a moving picture decoding apparatus disclosed in Japanese Patent Laid-Open Application No. Heisei 5-153574, a block in which an uncorrectable code error has occurred is replaced with a block picture produced based on motion vectors in the past determined based on frame pictures in the past and then is decoded thereby to correct a missing portion of the picture, which arises from the code error, smoothly with respect to a surrounding picture irrespective of whether or not the decoded picture exhibits some motion.

In the conventional MPEG coded picture decoding apparatus described above, since a degraded or missing portion of a decoded picture caused by a transmission error is merely replaced with a block picture produced based on motion vectors in the past, blurring of the contour of the corrected image cannot be avoided, and it is impossible to decode and display the same picture as a picture which does not suffer from the degradation or miss.

SUMMARY OF THE INVENTION

It is an object of the present invention to provide an MPEG coded picture decoding apparatus which can decode and display, even if a miss of MPEG coded video data occurs, for example, on the MPEG coding multiplexing side, in a transmission line or the like, video data the same as original data, which do not suffer from the miss, in units of one picture frame or one GOP (Group of Pictures) and can display pictures for several picture frames successively without suffering from a miss of a picture caused by the miss of the data.

In order to attain the object described above, according to the present invention, there is provided an MPEG coded picture decoding apparatus for MPEG coded au picture data transmitted thereto from an MPEG coding multiplexing side by means of a decoding element, comprising a memory for temporarily storing video data MPEG decoded by the decoding element in units of one picture frame, a memory management section for supervising the memory to detect whether or not picture data for one frame are stored into the memory completely without a miss, a video display processing section including a display memory into which video data for one picture frame successively read out from the memory are temporarily stored for several picture frames and from which the video data are read out so as to be displayed in the same order in units of one picture frame, an error processing section for checking memory storage information at an output of the memory management section at each video display timing and for outputting, when the memory storage information is not outputted from the memory management section, error information determining that a miss of data has occurred with a picture frame stored immediately before the display timing then and delivering a re-sending request to the MPEG coding-multiplexing side to re-send video data for the one picture frame, with which the miss of data has occurred, before the video data of the picture frame, with which the miss of data has occurred, or a GOP including the picture frame are read out from the video display processing section, and a control section for storing video data of the one picture frame or the GOP re-sent from the MPEG coding multiplexing side into the display memory of the video display processing section by a time at which the video data are to be displayed.

In the MPEG coded picture decoding apparatus, MPEG coded picture data are temporarily stored into the memory in units of one picture frame, and it is detected by supervision by the memory management section whether or not picture data for one frame are stored into the memory completely without a miss. Then, video data for one picture frame successively read out from the memory are temporarily stored for several picture frames into the display memory and then successively read out from the display memory in the same order in units of one picture frame so as to be displayed. Meanwhile, the storage condition of the memory for one picture frame is checked at each video display timing, and when picture data for one picture frame are not stored completely, it is determined that a miss of data has occurred with a picture frame stored immediately before the display timing then. Then, a re-sending request is delivered to the MPEG coding multiplexing side to re-send video data for the one picture frame, with which the miss of data has occurred, before the video data of the picture frame, with which the miss of data has occurred, or a GOP including the picture frame are read out from the video display processing section. Then, video data re-sent from the MPEG coding multiplexing side are stored newly into the display memory by a time at which the video data are to be displayed. Consequently, even if a miss of MPEG coded data occurs in the MPEG coding multiplexing side, the transmission line or the like, video data same as the original data which do not suffer from any miss can be displayed in units of a one picture frame or in units of a GOP. Accordingly, successive picture frames including the picture frame with which the miss of data has occurred can be displayed successively without a miss of any picture.

Further, since the error information can be used as a requesting signal to stop sending out of video data from the MPEG coding side following the picture frame with which the miss of data has occurred, even if the MPEG coded data after the miss of data are influenced by noise of the transmission line or by some other cause and suffer from an error, the display video data of a wrong picture frame or frames are not outputted. Consequently, a disagreeable feeling which may arise from such wrong picture frame or frames is not given to the video viewer at all.

According to another aspect of the present invention to provide an MPEG coded picture decoding apparatus, comprising a first memory for successively and temporarily storing a multiplexed stream inputted thereto from an MPEG coding multiplexing side via a transmission line and a line input interface and multiplexed from MPEG coded bit streams of a plurality of media including video and audio data, a pack header processing section for separating a pack header of the multiplexed stream read out from the first memory in response to a first control signal and extracting system clock reference information for a system clock reference, a packet processing section for separating a packet header from the multiplexed stream from the packet header separation section from which the pack header has been separated, extracting presentation time stamp information for a time reference and separating the multiplexed stream from the pack header processing section in units of a packet of each of the plurality of media, a GOP detection section for detecting a GOP from an MPEG video stream of video packets separated by the packet processing section, a first control section for outputting the first control signal and a second control signal in response to a GOP detection signal from the GOP detection section, a second memory for temporarily storing the MPEG video stream of the video packets separated by the packet processing section and being controlled by the second control signal from the first control section to read out the MPEG video stream temporarily stored therein in units of a GOP, a video MPEG decoding section for being controlled by a third control signal to MPEG decode video data in units of one picture frame outputted from the second memory, a third memory for temporarily storing decoded video data for one picture frame from the video MPEG decoding section, a memory management section for supervising a storage condition of the decoded video data for one picture frame into a storage region of the third memory and controlling, when the storage condition is regular, the third memory to output the decoded video data for one picture frame stored in the third memory, but outputting, when the storage condition is irregular, first error information, a fourth memory for temporarily storing the decoded video data for one picture frame outputted from the third memory for a first number of picture frames, a video display control section for controlling the decoded video data read out in units of one picture frame from the fourth memory in response to a fourth control signal so that the decoded video data may be outputted at a video display timing, a digital to analog conversion section for performing digital to analog conversion of the coded video data for each one picture frame from the video display control section and outputting and supplying the resulting analog decoded video data as an MPEG decoded picture signal to an external video viewer, a second control section for outputting the third and fourth control signals in response to a fifth control signal so that the third control signal is supplied to the second memory and the fourth control signal is supplied to the fourth memory, a display timing production section for producing and supplying the video display timing to the video display control section in order to allow the MPEG decoded picture signal outputted from the digital to analog conversion section to be displayed at a timing on a picture monitor of the video viewer, an error information processing section for supervising an input thereto of the first error information outputted from the memory management section at a timing of a period equal to that of the video display timing outputted from the display timing production section and outputting, when the first error information is inputted thereto, a video re-sending request signal based on the error information to the MPEG coding multiplexing side to request for re-sending of video data of the same picture frame as that of the video data with regard to which the first error information is outputted, a clock generation section for generating a decoding side clock signal to be used for MPEG decoding based on the system clock reference information extracted by the pack header processing section, a time information production section for producing decoding side time information to be used for MPEG decoding based on the presentation time stamp information extracted by the packet processing section, a synchronization timing production section for producing an AV synchronization timing for synchronization between the video and audio data upon MPEG decoding based on the decoding side time information outputted from the time information production section, and a CPU control section for receiving the decoding side clock signal from the clock generation section, the decoding side time information from the time information production section, the GOP detection signal from the GOP detection section and the video re-sending request signal from the error information processing section to drive a host CPU to control the MPEG decoding processing of the MPEG decoding section via a CPU bus and to output the fifth control signal to control the second control section and sending out the video re-sending request signal to the MPEG coding multiplexing side via a line output interface and the transmission line.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
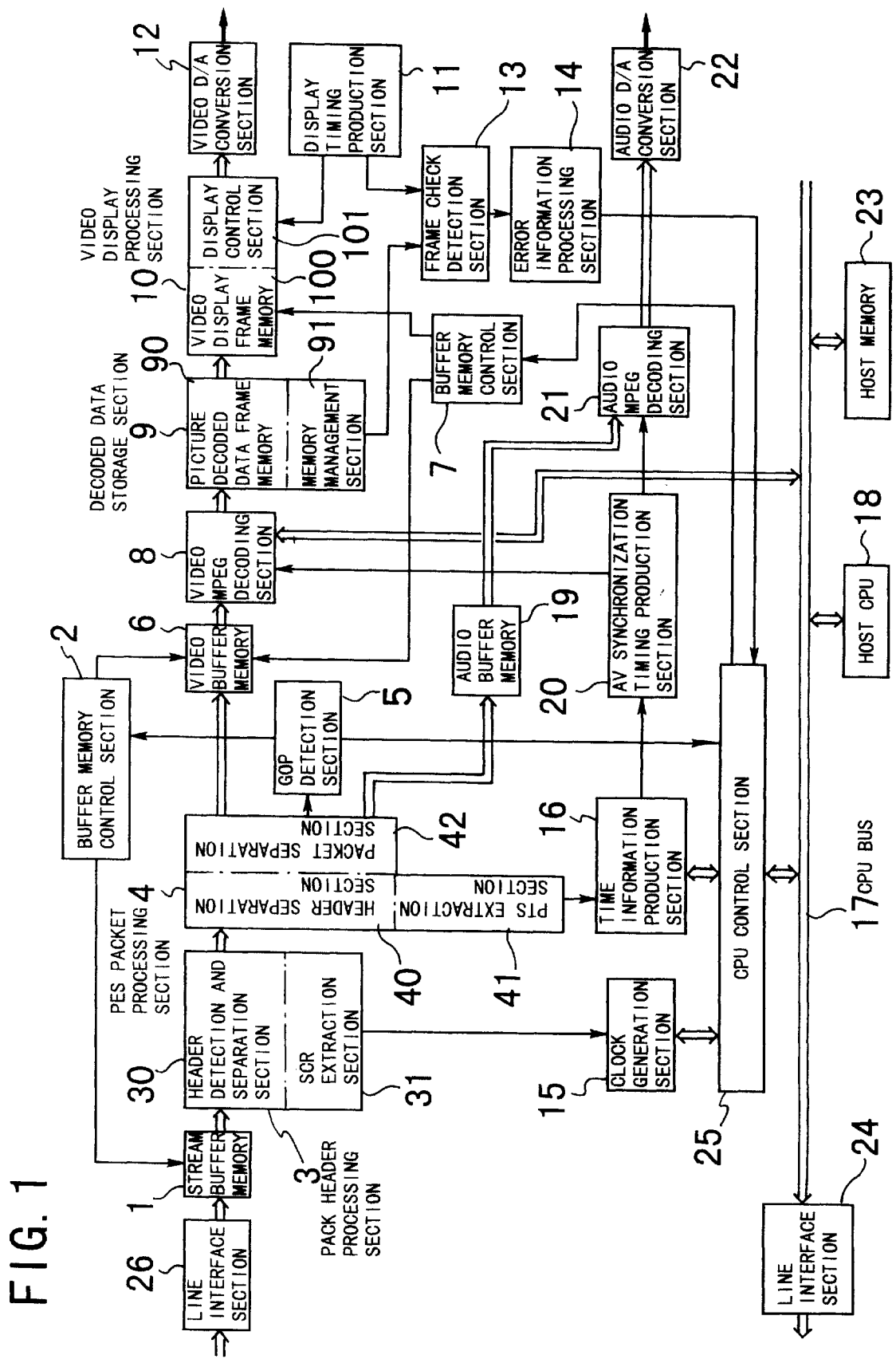
FIG. 1 is a block diagram of an MPEG coded picture decoding apparatus showing a preferred embodiment of the present invention.

Referring first to FIG. 1, there is shown an MPEG coded picture decoding apparatus to which the present invention is applied. The MPEG coded picture decoding apparatus shown includes a stream buffer memory 1, a buffer memory control section 2, a pack header processing section 3, a PES packet processing section 4, a GOP detection section 5, a video buffer memory 6, a buffer memory control section 7, a video MPEG decoding section 8, a decoded data storage section 9, a video display processing section 10, a display timing production section 11, a video D/A conversion section 12, a frame check detection section 13, an error information processing section 14, a clock generation section 15, a time information production section 16, an audio buffer memory 19, an AV synchronization timing production section 20, an audio MPEG decoding section 21, an audio D/A conversion section 22, and a CPU control section 25.

The stream buffer memory 1 temporarily stores a bit stream of MPEG coded multiplexed data sent out from a server side, that is, an MPEG coding multiplexing side via a high speed digital data private line, which flows digital data at a high speed in a fixed rate, and inputted thereto from a line interface section 26. The MPEG coded multiplex data are composed of multiplexed bit streams of a plurality of media of multimedia on-demand information such as moving pictures and sound.

The pack header processing section 3 includes a header detection and separation section 30 which separates a pack header of a bit stream of a pack layer read out from the stream buffer memory 1 under the control of the buffer memory control section 2 and detects a stream identification code (stream ID) of the separated pack header, and an SCR extraction section 31 for extracting, based on the stream identification code detected by the header detection and separation section 30, SCR code information for a system clock reference disposed subsequently to the stream identification code.

The PES packet processing section 4 includes a header separation section 40 for separating a PES (Packetized Elementary Stream) packet header from a stream for each medium factor packetized from a bit stream of an output of the pack header processing section 3 from which packet headers have been separated, and a PTS extraction section 41 for detecting a stream ID in the PES packet header separated by the header separation section 40 and extracting PTS (Presentation Time Stamp) code information which is video display time information in an optional PES header not shown disposed subsequently to the stream ID. The PES packet processing section 4 further includes a packet separation section 42 for separating, based on the stream ID in the PES packet header, video packets and audio packets from each other for each pack from the bit stream, from which PES packet headers have been separated, and outputting the video packets and the audio packets to a video packet output port, a GOP (Group Of Pictures) output port and an audio packet output port.

The PES packet processing section 4 detects a GOP flag which indicates the start of a VOP video stream from video packets for each of separated packets inputted thereto from the GOP output port of the PES packet processing section 4 from which PES packet headers have been separated.

The video buffer memory 6 temporarily stores a video stream inputted thereto from the video packet output port of the PES packet processing section 4. From the video buffer memory 6, picture data in the stored bit stream are read out in units of a GOP under the control of the buffer memory control section 2 and read out in units of one picture frame under the control of the buffer memory control section 7.

The video MPEG decoding section 8 MPEG decodes video data read out for each one picture frame of a unit of a GOP from the video buffer memory 6 under the control of a host CPU 18 via a CPU bus 17 and a host memory 23.

The decoded data storage section 9 includes a picture decoded data frame memory 90 for temporarily storing video data for one picture frame decoded by the video MPEG decoding section 8, and a memory management section 91 for supervising the storage condition of video data in a memory region temporarily stored in the picture decoded data frame memory 90 and stopping, when a data error such as a miss of video data in a predetermined memory region is detected, outputting from the picture decoded data frame memory 90 of video data of the one picture frame with which the data error has occurred and outputting an error detection signal, but outputting, if the video data are stored into the predetermined memory region without a miss of them, a regular storage signal simultaneously upon completion of the storage.

The video display processing section 10 includes a video display frame memory 100 for temporarily storing miss-free regular video data for several picture frames successively inputted thereto from the decoded data storage section 9, and a display control section 101 for being controlled by a video display timing signal outputted from the display timing production section 11 to output video data for one picture frame read out from the video display frame memory 100 under the control of the buffer memory control section 7 so that the video data may be displayed on a picture monitor of an external viewer not shown.

The video D/A conversion section 12 performs digital to analog (D/A) conversion of display video data outputted from the video display processing section 10 and outputs resulting analog data to the picture monitor of the external viewer mentioned above.

The video display processing section 10 receives, as input signals thereto, a regular storage signal outputted from the memory management section 91 of the decoded data storage section 9 and a video display timing signal outputted from the display timing production section 11. Then, the video display processing section 10 determines, if a regular storage signal is not inputted thereto when a video display timing signal is inputted thereto, that video data stored in the picture decoded data frame memory 90 suffer from a data error such as a miss, and outputs an error detection signal together with the error information.

The error information processing section 14 outputs, when a data error detection signal is inputted thereto from the frame check detection section 13, based on error information then, a video re-sending request signal for requesting for re-sending of video data of a picture frame, which which the data error has occurred, from the MPEG coding multiplexing side, a video stopping request signal for requesting for stopping of sending out of video data from the MPEG coding multiplexing side or a like signal.

The clock generation section 15 produces an intra-apparatus clock signal for MPEG decoding processing and so forth based on SCR code information extracted by the SCR extraction section 31 of the pack header processing section 3.

The time information production section 16 produces intra-apparatus time information for a read timing and an audio/video synchronization (AV synchronization) timing of MPEG decoded picture frame data based on PTS code information extracted by the PTS extraction section 41 of the PES packet processing section 4.

The display timing production section 11 outputs a display timing for picture frame picture display and a checking timing for checking of a picture frame memory storage condition and supplies them to the display control section 101 of the video display processing section 10 and the frame check detection section 13.

The buffer memory control section 2 controls reading out of pack stream data temporarily stored in the stream buffer memory 1 in response to a GOP detection signal supplied thereto from the GOP detection section 5 after each period of a GOP flag and controls, in response to the same GOP detection signal, reading out of 1 video PES stream data temporarily stored in the video buffer memory 6 and disposed subsequently to the GOP flag.

The buffer memory control section 7 outputs a control signal for reading out video data for one picture frame to be MPEG decoded in a picture frame period from the video buffer memory 6 and outputs another control signal for reading out video data of a predetermined number of picture frames temporarily stored in the video display frame memory 100 of the video display processing section 10 one by one picture frame in the same picture frame period under the control of the CPU control section 25.

The audio buffer memory 19 temporarily stores an audio stream inputted thereto from the audio packet output port of the PES packet processing section 4.

The AV synchronization timing production section 20 produces an AV synchronization timing signal for synchronization of video and audio data of MPEG decoded data in response to intra-apparatus time information outputted from the time information production section 16, and supplies the AV synchronization timing signal to the video MPEG decoding section 8 and the audio MPEG decoding section 21.

The audio MPEG decoding section 21 MPEG decodes an audio stream read out from the audio buffer memory 19 under the control of the host CPU 18 via the CPU bus 17 and the host memory 23.

The audio D/A conversion section 22 performs digital to analog conversion of decoded audio data outputted from the audio MPEG decoding section 21 and sends out the resulting analog data to the video viewer.

The CPU control section 25 receives an intra-apparatus clock signal from the clock generation section 15, intra-apparatus time information from the time information production section 16, a GOP detection signal from the GOP detection section 5 and an error information signal from the error information processing section 14 and controls the host CPU 18 via the CPU bus 17 and the host memory 23 to effect control and transfer of data to and from the video MPEG decoding section 8, the audio MPEG decoding section 21, the buffer memory control section 7 and so forth. Further, the CPU control section 25 controls sending out of error information such as a request signal for requesting for re-sending of video data of a picture frame, with which a data error such as a miss of data has occurred, or for stopping of sending out of video data to the MPEG coding multiplexing side via a line interface section 24.

Figure 2:
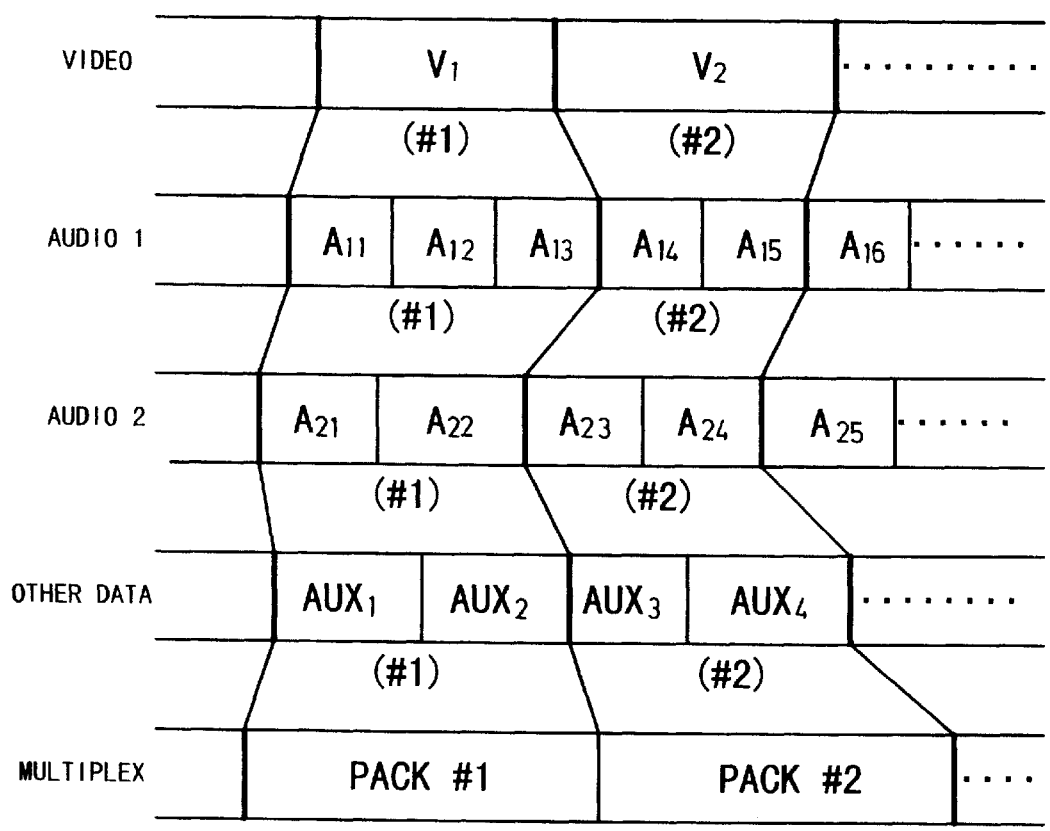
FIG. 2 is a diagrammatic view illustrating an example of multiplexing by the MPEG coded picture decoding apparatus of FIG. 1 when multimedia on-demand information is MPEG multiplexed.
Figure 3:
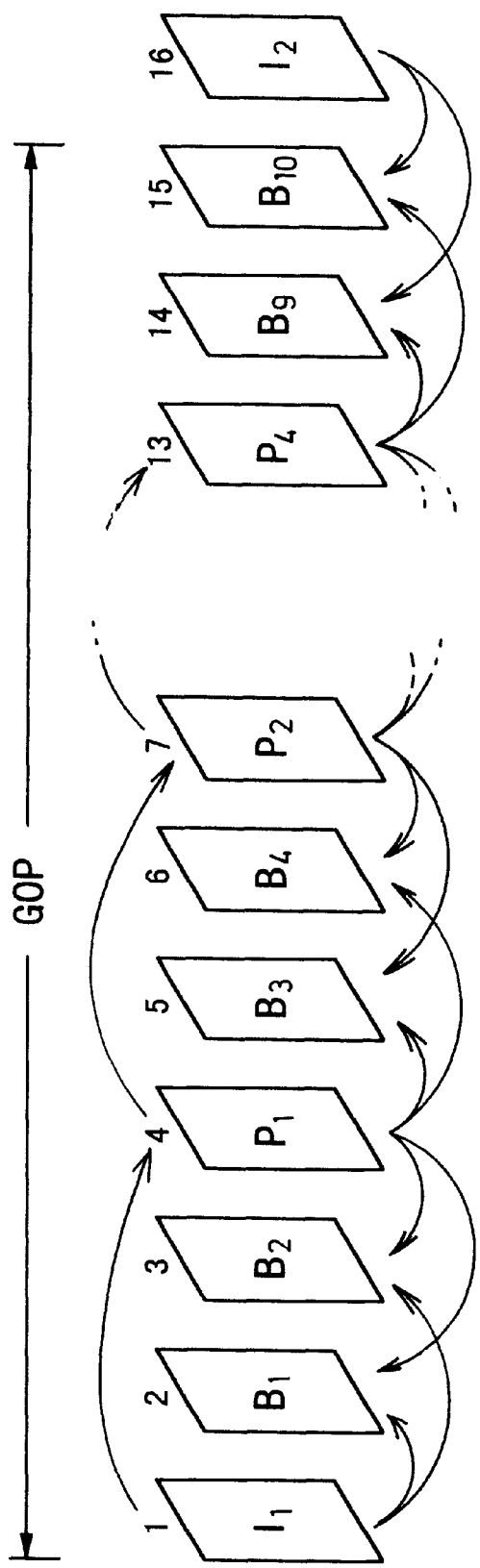
FIG. 3 is a diagrammatic view illustrating an example of an MPEG coding sequence and an inter-picture prediction method within one GOP by the MPEG coded picture decoding apparatus of FIG. 1.
Figure 4:
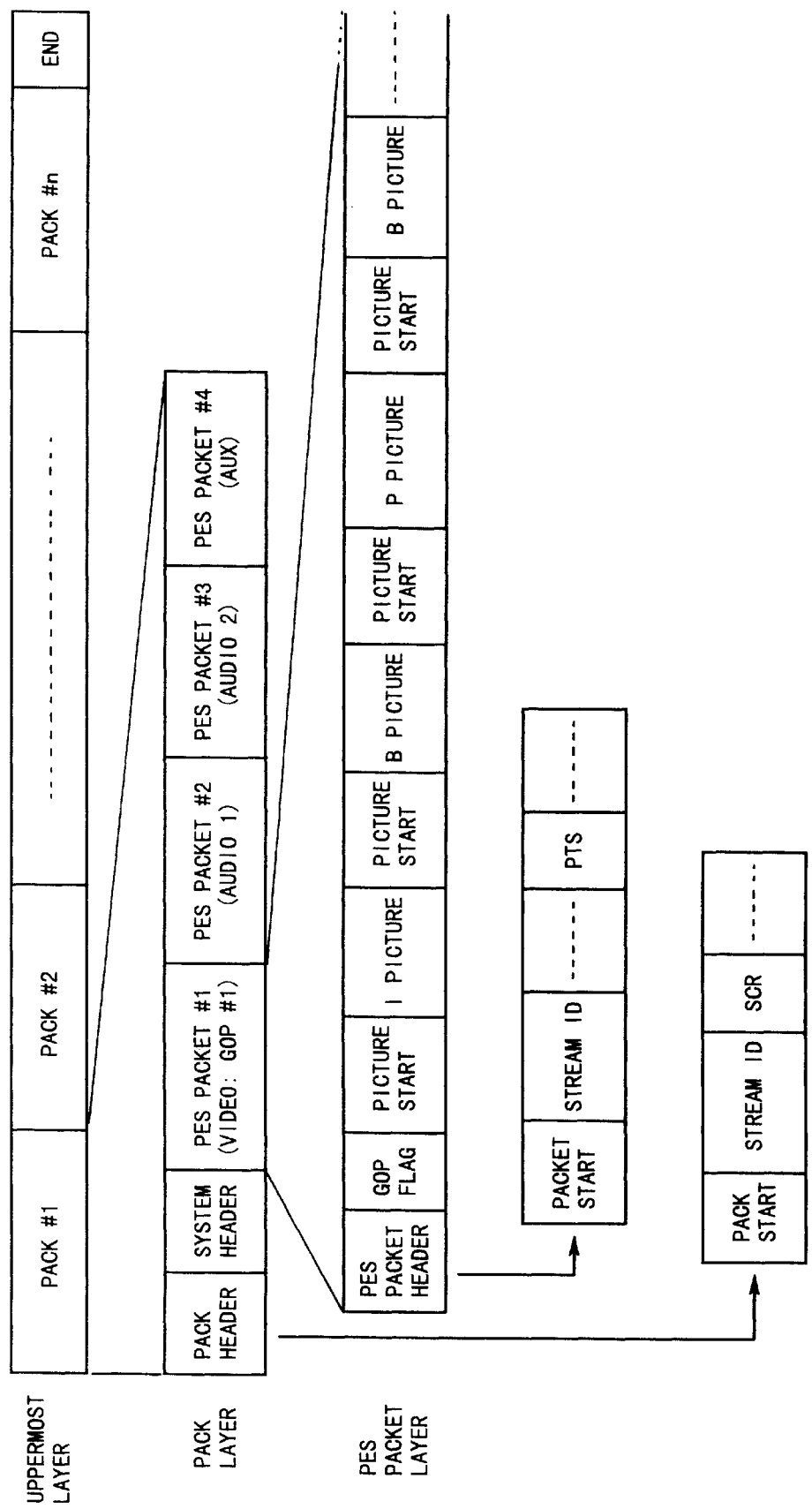
FIG. 4 is a diagrammatic view showing an example of a stream data array of an MPEG coded bit stream of the MPEG coded picture decoding apparatus of FIG. 1.

FIG. 2 illustrates an example of multiplexing when, for example, a moving picture signal, an audio signal and other signals (for example, a character data signal) of multimedia on-demand information are multiplexed. FIG. 3 illustrates an example of a coding order in one GOP of an I picture, P pictures and B pictures where one GOP includes 15 frames and an inter-picture prediction method between pictures. FIG. 4 illustrates an example of a stream data array of an MPEG coded bit stream.

Referring to FIG. 1 to 4, when a plurality of MPEG coded bit streams of moving picture data, audio data, character data and some other data of multimedia on-demand information are to be transmitted to a viewer side via a transmission line, data of the bit streams within substantially the same time periods are collected to form a packet, and a plurality of such packets are individually time division multiplexed to form a plurality of packs.

FIG. 2 illustrates an example of data structure wherein video data of moving pictures are delineated into data V1, V2, . . . on the time base while audio data 1 of the sound (for example, the right side sound of the stereo sound) are delineated into data A11, . . . , A16, . . . and audio data 2 of the sound (for example, the left side sound of the stereo sound) are delineated into data A21, . . . , A25, . . . , and other data such as, for example, character data to be inserted in a screen are delineated into data AUX1, . . . , AUX4, . . .

Here, if the data V1, V2, . . . of the video data are determined as video packets V1, V2, . . . respectively, then the video packets V1, V2, . . . make a reference for construction of packets of the other audio and character data. In particular, taking the packet construction for the audio data 1 as an example, from among the data A11 to A16 of the video data 1, the data A11 to A13 which are within substantially the same time periods as the time period the video data V1 are collected to form a first audio 1 packet #1, and the data A14 and A15 which are within substantially same time period as the time period the video data V2 are collected to form a second audio 1 packet #2. Thus, a stream which includes the audio 1 packet #1, the audio 1 packet #2, . . . is produced, and the audio 1 packet #1 and the audio 1 packet #2 of the stream correspond to a PES packet #2 in the pack layer shown in FIG. 4.

The video packets #1, #2, . . . , audio 1 packets #1, #2, . . . , audio 2 packets #1, #2, . . . and character packets #1, #2, . . . constructed in this manner are time division multiplexed such that the first packets (#1) of them are time division multiplexed and the second packets (#2) of them are time division multiplexed (here, for the convenience of decoding, video data, audio data and character data are multiplexed in this order) to construct a pack #1 and another pack #2, respectively. Thus, a pack stream which corresponds to the uppermost layer shown in FIG. 4 is formed from the packs #1, #2, . . .

It is to be noted that a packet header for each medium of a PES packet includes time stamp PTS code information which makes a reference to time information which is used to establish synchronism among the media upon decoding by the decoding side and so forth.

FIG. 3 illustrates an array of picture frames which construct one GOP of compression coded pictures in one video packet and particularly shows an example wherein one GOP is formed from 15 picture frames. In particular, one GOP is composed of one I picture frame I1 always disposed at the top of the GOP and making a base for predictive coding of the other picture frames, four P picture frames P1 to P4 formed by forward predictive coding from the I picture frame and ten B picture frames B1 to B10 formed by bidirectional coding from the I picture frame and the next P picture frame or from two adjacent ones of the P picture frames. Upon decoding, the pictures are decoded in order of I1, B1, B2, P1, . . . , B10. The picture stream of the video PES packet #1 in the PES packet layer of FIG. 4 is shown including the I1, B1, B2, P1 and B3 pictures of FIG. 3, and a picture start code which indicates the start of a picture is added to the top of each of the picture frames.

Subsequently, operation of the MPEG coded picture decoding apparatus will be described.

An MPEG coded and multiplexed pack stream of the uppermost layer, that is, an MPEG multiplexed bit stream, is inputted to the MPEG coded picture decoding apparatus via a transmission line such as, for example, a high speed digital private line and stored into the stream buffer memory 1 via the line interface section 26.

The buffer memory control section 2 controls the stream buffer memory 1 in response to a GOP detection signal from the GOP detection section 5 detected from a GOP flag of a video PES packet of the PES packet layer, and reads out, each time such GOP flag is detected, stream data of a pack packet from which the GOP has been detected.

The pack header processing section 3 separates a pack header of the pack layer read out from the stream buffer memory 1 based on a pack start code and a stream ID code in the header, extracts SCR code information for a system clock reference disposed in the separated header, and supplies the SCR code information to the clock generation section 15 which produces an intra-apparatus clock signal to be used on the decoding side.

The PES packet processing section 4 separates a PES packet header from the PES packet stream, which is inputted from the pack header processing section 3 and from which the pack header has been separated, based on the packet start code and the stream ID code in the PES packet header disposed at the top of each PES packet, extracts PTS code information, which makes a reference for time information, disposed in the separated PES packet header, and supplies timing information to the time information production section 16, for example, for synchronization between coded video data and coded audio data to be used on the decoding side. Further, the PES packet processing section 4 separates the PES packet stream into PES packets for individual media (in FIG. 1, the construction for separation of character PES packets is omitted for convenience of illustration), and outputs video PES packets to the video output port, outputs audio 1 PES packets and audio 2 PES packets to the audio output port and outputs video PES packets, from which packet headers have been separated, to the GOP output port.

Then, the video buffer memory 6 stores the picture stream of the video PES packets input thereto from the video output port of the PES packet processing section 4 while the audio buffer memory 19 stores the audio stream of the audio PES packets inputted thereto from the audio output port.

The GOP detection section 5 detects, from a video PES packet which has been input thereto from the GOP output port of the PES packet processing section 4 and from which the PES packet headers have been separated, a GOP flag arranged at the top of the video PES packet and outputs and supplies the GOP flag as a GOP detection signal to the buffer memory control section 2 in order to allow production of a timing at which the individual stream data are to be read out from the stream buffer memory 1 and the video buffer memory 6 after each GOP period. Here, although the first GOP flag is not detected unless the first pack packet is read out from the stream buffer memory 1, even if the stream buffer memory 1 is not controlled to read out data therefrom, since data are discharged from the stream buffer memory 1 beginning with data stored first when data are stored by more than a predetermined amount, the first GOP flag of the first pack stream is detected with certainty.

Consequently, the buffer memory control section 2 performs reading of the stream buffer memory 1 described above and simultaneously performs reading control of the video buffer memory 6. In particular, while data are read out from the video buffer memory 6 in units of a video PES packet after each GOP period under the control of the buffer memory control section 2, those data to be actually output to the video MPEG decoding section 8 are read out in units of a picture after each picture frame period under the control of the buffer memory control section 7.

The video MPEG decoding section 8 MPEG decodes a picture stream data read out in units of one picture frame and in order of the picture array in one GOP of FIG. 3 from the video buffer memory 6 and stores the decoded picture stream data into the picture decoded data frame memory 90 which is a one frame memory (for example, in the NTSC video system of MPEG2, a memory for information of 720×480 pixels) of the decoded data storage section 9.

The memory management section 91 of the decoded data storage section 9 outputs, after the decoded data for one picture frame inputted thereto from the video MPEG decoding section 8 are stored fully or regularly into the picture decoded data frame memory 90, the picture decoded data for the one picture frame so that they may be stored into the video display frame memory 100 of the video display processing section 10. Here, if decoded data for one frame are not fully or regularly stored into the picture decoded data frame memory 90, that is, if some picture decoded data misses, then the memory management section 91 outputs, together with an error detection signal, error information such as information of a picture position of the picture frame, which suffers from the miss of data, detected by counting an order number of storages of decoded data starting from a time at which I picture decoded data were stored together with start code information. On the other hand, when all picture decoded data are stored fully or regularly, the memory management section 91 outputs a regular storage signal upon completion of the storage and simultaneously outputs the stored picture decoded data to the video display frame memory 100.

Regular picture decoded data output from the picture decoded data frame memory 90 are stored for several picture frames into the video display frame memory 100 of the video display processing section 10. Otherwise, if an error detection signal of a data miss is output from the memory management section 91 and a picture re-sending request signal from the error information processing section 14 is sent out to the MPEG coding multiplexing side via the CPU control section 25 and then, before data are re-sent in response to the re-sending request and MPEG decoded and stored into the picture decoded data frame memory 90 again, the picture decoded data for several picture frames which have been stored in the video display frame memory 100 until then are read out so as to be displayed on a screen, then when the next picture frame with which the data miss has occurred is displayed on the screen, a pause condition is entered while the display screen remains displaying a screen of the immediately preceding picture frame and pictures for several picture frames will miss in the pause condition. Therefore, in order to assure sufficient time after a re-sending request until completion of storage of re-sent picture decoded data, picture decoded data for a required number of picture frames are stored into the video display frame memory 100.

Then, the display control section 101 of the video display processing section 10 outputs picture decoded data read out for each one picture frame from the video display frame memory 100 so as to be displayed on the screen after each picture frame period under the control of the buffer memory control section 7 to the video D/A conversion section 12 in response to a video display timing signal supplied thereto from the display timing production section 11.

Here, the video display timing signal output from the display timing production section 11 is, for example, a frame signal of the period of 1/30 second which is a video vertical synchronizing signal of the NTSC system.

The frame check detection section 13 supervises the output of the memory management section 91 of the picture decoded data frame memory 90 after each period of the video display timing signal supplied thereto from the display timing production section 11, and outputs nothing if a correct storage signal is received at each video displaying timing, but outputs, if an error detection signal is received at a video display timing, error information to the error information processing section 14 together with an error detection signal.

The error information processing section 14 produces a video re-sending request signal for requesting for re-sending of the video data of the picture frame, with which the error has occurred, or for re-sending of one GOP including the picture frame to the MPEG coding multiplexing side via the CPU control section 25 based on the error information including picture position information supplied thereto from the memory management section 91 via the frame check detection section 13, and supplies the video re-sending request signal to the CPU control section 25.

The CPU control section 25 controls the video MPEG decoding section 8, the audio MPEG decoding section 21 and the buffer memory control section 7 via the host memory 23 and the host CPU 18 in response to the intra-apparatus clock signal from the clock generation section 15, the intra-apparatus time information from the time information production section 16, the GOP signal from the GOP detection section 5 and so forth to effect control of MPEG decoding processing, reading processing from the buffer memory and so forth. Further, the CPU control section 25 develops a re-sending request for video data of the picture frame, with which the data miss has occurred, or for video data of one GOP including the picture frame to the MPEG coding multiplexing side via the line interface section 24.

It is to be noted that the error processing of the error information processing section 14 may include not only delivery of a video re-sending request for a picture frame with which a data miss has occurred, or for a GOP including the picture frame but also delivery of a request for stopping the sending out of the following video data when an error is detected with an I picture or a P picture. In particular, if, for example, a miss of data occurs on the coding side and this error is not detected on the coding side and is sent out without being corrected, then if the miss of data occurs with an I picture or a P picture, there is the possibility that a miss or an error of data may occur also with a P picture and B pictures which are predictively coded based on the I picture or with B pictures predictive coded based on the P picture. Therefore, in order to prevent an influence of the miss or error of data upon a screen display, a request to stop sending video data is delivered when an error is detected with an I picture or a P picture.

Having now fully described the invention, it will be apparent to one of ordinary skill in the art that many changes and modifications can be made thereto without departing from the spirit and scope of the invention as set forth herein.

What is claimed is:

1. A coded picture decoding apparatus for processing coded video data transmitted thereto from a coding multiplexing side and decoded by a decoding element, said decoding apparatus comprising:

a memory for temporarily storing the decoded video data in units of one picture frame;

a memory management section for supervising said memory to detect whether or not picture data for the stored frames are stored into said memory completely without a miss;

a video display processing section including a display memory into which video data for a plurality of picture frames successively read out from said memory are temporarily stored and from which the video data are read out in units of one picture frame so as to be displayed in the same order as the video data were stored;

an error processing section for checking memory storage information at an output of said memory management section at each video display timing and for outputting, when the memory storage information is not outputted from said memory management section, error information determining that a miss of data has occurred with a picture frame stored immediately before the display timing, and delivering a re-sending request to said coding multiplexing side to re-send video data for the one picture frame in which the miss of data has occurred while maintaining any subsequently received error-free picture frames in said video display processing section display memory; and a control section for storing video data of the one picture frame re-sent from said coding multiplexing side into said display memory of said video display processing section before the re-sent video data are displayed.

2. The coded picture decoding apparatus according to claim 1, wherein said re-sending request is for a GOP which includes the picture frame in which the miss of data has occurred and wherein said control section stores the GOP.

3. A coded picture decoding apparatus, comprising:

a first memory for successively and temporarily storing a multiplexed stream inputted thereto from a coding multiplexing side via a transmission line and a line input interface and multiplexed from coded bit streams of a plurality of media including video and audio data;

a pack header processing section for separating a pack header of the multiplexed stream read out from said first memory in response to a first control signal and extracting system clock reference information for a system clock reference;

a packet processing section for separating a packet header from the multiplexed stream from said pack header processing section from which the pack header has been separated, extracting presentation time stamp information for a time reference and separating the multiplexed stream from said pack header processing section in units of a packet of each of the plurality of media;

a GOP detection section for detecting a GOP from a video stream of video packets separated by said packet processing section;

a first control section for outputting the first control signal and a second control signal in response to a GOP detection signal from said GOP detection section;

a second memory for temporarily storing the video stream of the video packets separated by said packet processing section and being controlled by the second control signal from said first control section to read out the video stream temporarily stored therein in units of a GOP;

a video decoding section being controlled by a third control signal to decode video data in units of one picture frame outputted from said second memory;

a third memory for temporarily storing decoded video data for one picture frame from said video decoding section;

a memory management section for supervising a storage condition of the decoded video data for one picture frame into a storage region of said third memory and controlling, when the storage condition is regular, said third memory to output the decoded video data for one picture frame stored in said third memory, but outputting, when the storage condition is irregular, first error information;

a fourth memory for temporarily storing the decoded video data for one picture frame outputted from said third memory for a first number of picture frames;

a video display control section for controlling the decoded video data read out in units of one picture frame from said fourth memory in response to a fourth control signal so that the decoded video data is outputted at a video display timing;

a digital to analog conversion section for performing digital to analog conversion of the decoded video data for each one picture frame from said video display control section and outputting and supplying the resulting analog decoded video data as a decoded picture signal to an external video viewer;

a second control section for outputting the third and fourth control signals in response to a fifth control signal so that the third control signal is supplied to said second memory and the fourth control signal is supplied to said fourth memory;

a display timing production section for producing and supplying the video display timing to said video display control section in order to allow the decoded picture signal outputted from said digital to analog conversion section to be displayed at a timing on a picture monitor of the video viewer;

an error information processing section for supervising an input thereto of the first error information outputted from said memory management section at a timing of a period equal to that of the video display timing outputted from said display timing production section and outputting, when the first error information is inputted thereto, a video re-sending request signal based on the error information to said coding multiplexing side to request for re-sending of video data of the same picture frame as that of the video data with regard to which the first error information is outputted;

a clock generation section for generating a decoding side clock signal to be used for decoding based on the system clock reference information extracted by said pack header processing section;

a time information production section for producing decoding side time information to be used for decoding based on the presentation time stamp information extracted by said packet processing section;

a synchronization timing production section for producing an AV synchronization timing for synchronization between the video and audio data upon decoding based on the decoding side time information outputted from said time information production section; and a CPU control section for receiving the decoding side clock signal from said clock generation section, the decoding side time information from said time information production section, the GOP detection signal from said GOP detection section and the video re-sending request signal from said error information processing section to drive a host CPU to control the decoding processing of said decoding section via a CPU bus and to output the fifth control signal to control said second control section and sending out the video re-sending request signal to said coding multiplexing side via a line output interface and said transmission line.

* * * * *